United States Patent
Wendrock et al.

(10) Patent No.: US 9,212,838 B2
(45) Date of Patent: Dec. 15, 2015

(54) COOLING DEVICE FOR VEHICLES AND METHOD FOR CONTROLLING AND/OR REGULATING A COOLING DEVICE

(71) Applicant: Bayerische Motoren Werke Aktiengesellschaft, Munich (DE)

(72) Inventors: Gregor Wendrock, Munich (DE); Michael Nirschl, Obergangkofen (DE); Nicolas Flahaut, Munich (DE); Micha Dirmeier, Munich (DE); Robert Lustig, Munich (DE); Christopher Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 371 days.

(21) Appl. No.: 13/673,209

(22) Filed: Nov. 9, 2012

(65) Prior Publication Data
US 2013/0333398 A1  Dec. 19, 2013

(30) Foreign Application Priority Data

Jun. 18, 2012 (DE) .......................... 10 2012 210 221

(51) Int. Cl.
| | |
|---|---|
| F25B 49/02 | (2006.01) |
| F25B 39/02 | (2006.01) |
| F25B 41/04 | (2006.01) |
| F25B 5/02 | (2006.01) |
| B60H 1/00 | (2006.01) |

(52) U.S. Cl.
CPC .......... *F25B 49/022* (2013.01); *B60H 1/00278* (2013.01); *F25B 5/02* (2013.01); *F25B 39/028* (2013.01); *F25B 41/043* (2013.01); *F25B 49/025* (2013.01); *B60H 2001/00307* (2013.01); *F25B 2341/0661* (2013.01); *F25B 2600/025* (2013.01); *F25B 2600/2513* (2013.01); *F25B 2600/2519* (2013.01)

(58) Field of Classification Search
CPC ............... F25B 49/02; F25B 2313/023; F25B 2313/0232; F25B 2313/02331; F25B 2400/0409; F25B 2600/025; F25B 2600/2511; B60H 2011/00949; B60H 2011/3272
USPC .............................. 62/199, 200, 228.1, 228.4
See application file for complete search history.

(56) References Cited

U.S. PATENT DOCUMENTS

2009/0314018 A1* 12/2009 Burchill et al. .............. 62/228.4

FOREIGN PATENT DOCUMENTS

| | | |
|---|---|---|
| DE | 103 50 803 A1 | 6/2005 |
| DE | 10 2006 053 674 A1 | 5/2008 |
| DE | 10 2009 033 884 A1 | 1/2011 |

OTHER PUBLICATIONS

German Office Action dated Feb. 18, 2013 (four (4) pages).

*Primary Examiner* — Marc Norman
(74) *Attorney, Agent, or Firm* — Crowell & Moring LLP

(57) ABSTRACT

A cooling device and to a method for controlling a cooling device for vehicles is provided, the cooling device including a refrigerant compressor, a condenser downstream of the refrigerant compressor in the flow direction of the refrigerant, a first evaporator downstream of the condenser for cooling air to be supplied to the passenger compartment, a second evaporator arranged parallel to the first evaporator for cooling an electric accumulator, and a control unit which is configured to control the refrigerant compressor as a function of the cooling demands for the passenger compartment and/or the electric accumulator on the basis of the higher cooling demand requirement. The cooling device may further include electric valves between the condenser and the first and second evaporators to control a cooling capacity of the first and/or second evaporator to meet the cooling demands of the passenger compartment and/or the electric accumulator.

10 Claims, 1 Drawing Sheet

COOLING DEVICE FOR VEHICLES AND METHOD FOR CONTROLLING AND/OR REGULATING A COOLING DEVICE

CROSS-REFERENCE TO RELATED APPLICATION

This application claims priority under 35 U.S.C. §119 from German Patent Application No. DE 10 2012 210 221.3, filed Jun. 18, 2012, the entire disclosure of which is herein expressly incorporated by reference.

BACKGROUND AND SUMMARY OF THE INVENTION

The invention relates to a cooling device for vehicles and a method for actuating a cooling device.

It is well known that a refrigerant circuit of an air conditioning system has, when viewed in the direction of flow of the refrigerant, a refrigerant compressor, a condenser, at least one expansion element and one or more evaporators. Vehicle air conditioning systems of many luxury vehicles are equipped with two evaporators, which are connected in parallel. In this case one evaporator is allocated to the front area, and the second evaporator is allocated to the rear area of the passenger compartment. Such vehicle air conditioning systems are usually equipped in such a way that the evaporator or more specifically the cooling circuit, which is responsible for the front area, has a higher priority, in order to implement the corresponding cooling demand requirement for the front area. One example of such an air conditioning system is known from German Patent Publication No. DE 10 2006 053 674 A1.

"Dual evaporator systems" are also common in vehicles. In this case the one evaporator is provided for cooling the passenger compartment; and the other evaporator is provided for cooling the electric and/or electronic components, such as the electric control units, electric energy accumulators, etc.

Here, too, the rotational speed of the compressor is controlled by the cooling demand requirement for the passenger compartment and, in particular, independently of the cooling requirement for the electric accumulator.

One example of a dual evaporator system for cooling the passenger compartment and the electric accumulators is German Patent Publication No. DE 10 2009 033 884 A1. This cooling device comprises a refrigerant compressor; a condenser, which is arranged downstream of the refrigerant compressor in the direction of flow of the refrigerant; a first evaporator, which is arranged downstream of the condenser and is intended for cooling the electric accumulators; and a second evaporator, which is arranged parallel to the first evaporator and is intended for cooling the passenger compartment, wherein the evaporator capacity of the second evaporator can be adjusted by a corresponding valve.

Especially in the case of vehicles, equipped with high voltage accumulators for storing electric energy, optimal cooling of these high voltage accumulators is absolutely mandatory, because the thermal management of electric accumulators is crucial for the service life and safety during on-going operations. For this purpose the lithium ion cells have to stay in an ideal operating temperature range between 20° C. and 40° C.; and all of the cells have to be operated homogeneously in a range of 5 K.

If at this point the cooling demand for the passenger compartment of the vehicle is less than the cooling demand for the electric accumulators or if under some circumstances there is no cooling demand at all for the passenger compartment (for example, in the winter), then the cooling capacity or more specifically the necessary refrigerant mass flow for the electric accumulators is missing. Consequently the temperature of the electric accumulators rises; and, in addition, the temperature spread in the electric accumulator is negatively affected.

At this point the object of the present invention is to provide a cooling device for vehicles and a method that is intended for controlling a corresponding cooling device and that always enables an optimal cooling management of the electric accumulator.

This engineering object is achieved by means of a method and an apparatus for controlling and/or regulating a cooling device for vehicles, the cooling device having a refrigerant compressor, a condenser downstream of the refrigerant compressor, a first evaporator downstream of the condenser for cooling the air to be supplied to the passenger compartment, and a second evaporator parallel to the first evaporator, where a control unit controls the refrigerant compressor as a function of the higher of the cooling demand for the passenger compartment and/or a cooling demand for the electric accumulator.

The starting point of the method according to the invention is a cooling device that is intended for vehicles and that comprises a refrigerant compressor; a condenser, which is arranged downstream of the refrigerant compressor in the direction of flow of the refrigerant; a first evaporator, which is arranged downstream of the condenser and is intended for cooling the air to be supplied to the passenger compartment; and a second evaporator, which is arranged parallel to the first evaporator and is intended for cooling an electric accumulator. Furthermore, there is a control unit that drives or controls at least the refrigerant compressor.

The essence of the method according to the invention lies in the fact that the refrigerant compressor is driven in different ways as a function of a cooling demand requirement for the passenger compartment and/or a cooling demand requirement for the electric accumulator. Correspondingly the invention provides that the refrigerant compressor is driven or controlled on the basis of the higher cooling demand requirement, so that an adequate refrigerant flow for both evaporators is always provided.

In order to be able to ensure that, nevertheless, each requirement is met—that is, each requirement can be implemented—for example, based on a high cooling demand requirement of the one evaporator in relation to the other evaporator, the cooling device according to the invention comprises not only the aforementioned components, but also in addition a first electric valve, which can be driven between the condenser and the second evaporator and which is intended to have an effect on the evaporator capacity of the first evaporator, and a second electric valve, which can be driven between the condenser and the second evaporator and which is intended to have an effect on the evaporator capacity of the second evaporator. The two electric valves are designed advantageously as solenoid valves.

If at this point the cooling unit comprises at least one of the two valves (a first electric valve, which can be driven between the condenser and the first evaporator and which is intended to have an effect on the evaporator capacity of the first evaporator, and/or a second electric valve, which can be driven between the condenser and the second evaporator and which is intended to have an effect on the evaporator capacity of the second evaporator), then in an advantageous further development of the method according to the invention the control unit can drive the first electric valve and/or the second electric valve as a function of the cooling demand requirement for the passenger compartment and/or the cooling demand requirement for the electric accumulator in such a way that the evaporator can be set to the desired refrigerating capacity as a function of the respective requirement, even if under some circumstances the refrigerant compressor is not driven or adjusted with respect to the corresponding requirement.

At this point the method according to the invention can be further developed now in such detail that if, for example, there is a cooling demand requirement for just the electric accumulator alone (that is, there is no cooling demand requirement for the passenger compartment), then the refrigerant compressor is driven at a defined rotational speed required for cooling the energy accumulator and/or that the first electric valve, which has an effect on the cooling capacity of the first evaporator, is closed. This approach can ensure that the electric accumulator is adequately cooled, but that at the same time the passenger compartment is not cooled unintentionally.

If there is a cooling demand requirement for the passenger compartment, but it is less than the cooling demand requirement for the electric accumulator, then the refrigerant compressor is driven in a manner analogous to above at a defined rotational speed required for cooling the energy accumulator. However, at the same time the first electric valve, which has an effect on the cooling capacity of the first evaporator, is not completely closed, but rather is driven in such a way that a cooling capacity, which is reduced relative to the other when the first valve is open, is achieved, in particular in such a way that the cooling demand requirement for the passenger compartment is achieved.

In the third application, where the cooling demand requirement for the passenger compartment is higher than the cooling demand requirement for the electric accumulator, then the refrigerant compressor is regulated (in a manner analogous to the state of the art) on the basis of the cooling demand requirement for the passenger compartment; and/or the second electric valve, which has an effect on the cooling capacity of the second evaporator is driven in such a way that a cooling capacity, which is reduced relative to the other when the second valve is open, is achieved, in particular in such a way that the cooling demand requirement for the accumulator is achieved.

Such an embodiment of the control and/or regulating strategy for the cooling device, comprising two evaporators, can ensure a cooling or more specifically a cooling capacity of the respective evaporator that is adjusted exactly to the respective needs.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
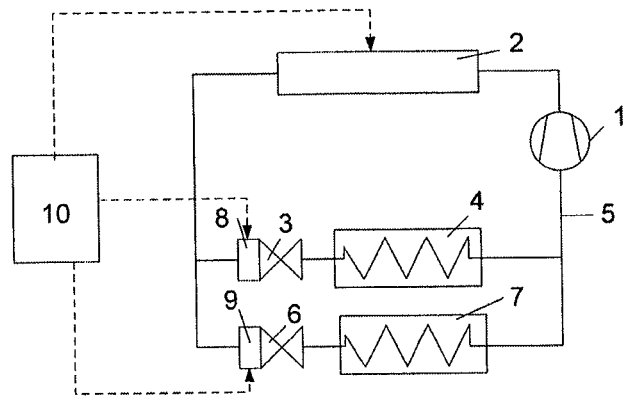
FIG. 1 shows in schematic form a cooling device according to the invention.

FIG. 1 shows a cooling device comprising a condenser 2, which dissipates the heat output to the environment and which is disposed, when viewed in the direction of flow of the refrigerant, downstream of a compressor 1. The compressed refrigerant coming from the condenser 2 expands by way of a first expansion element 3 and then flows over a first evaporator 4, which serves to cool the air, which is to be supplied to a passenger compartment, back to a suction side 5 of the refrigerant compressor 1. A second expansion element 6 and a second evaporator 7 are connected in parallel to the first expansion element 3 and the first evaporator 4. In this case the second evaporator 7 is provided for cooling a high voltage accumulator.

In addition, an actuable first electric valve 8, designed as a solenoid valve, is provided between the condenser 2 and the first evaporator 4 or more specifically the expansion element 3, which is arranged upstream of the first evaporator 4; and this first electric valve has an effect on the evaporator capacity of the first evaporator 4. Similarly an actuable second electric valve 9, designed as a solenoid valve, is provided between the condenser 2 and the second evaporator 7 or more specifically the expansion element 6, which is arranged upstream of the second evaporator 7; and this second electric valve is intended to have an effect on the evaporator capacity of the second evaporator 7. Finally FIG. 1 also shows a control unit 12, which serves to drive the compressor 1 and the two solenoid valves 8 and 9.

Figure 2:
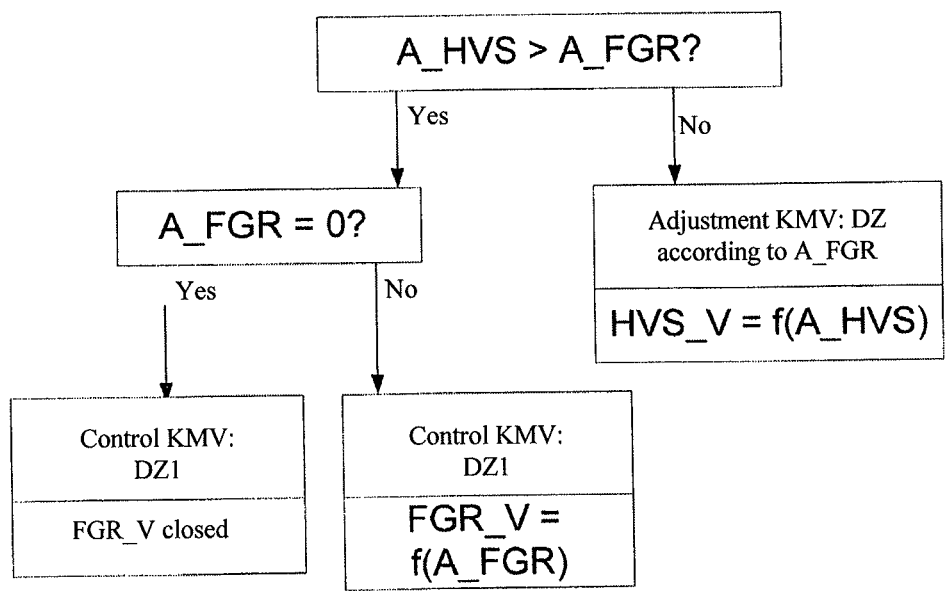
FIG. 2 is a highly simplified flow chart to illustrate the method according to the invention.

At this point one possible embodiment of the sequence for controlling and/or regulating a cooling device, as shown in FIG. 1, is explained with reference to the flow chart in FIG. 2.

The sequence begins with the query—which of the two cooling demand requirements is greater—that is, it checks whether the cooling demand requirement A_HVS of the electric accumulator is greater than the cooling demand requirement A_FGR of the passenger compartment. If this is not the case, then the next step performs a closed loop control of the (refrigerant) compressor KMV based on the cooling demand requirement A_FGR of the passenger compartment—that is, the rotational speed of the compressor is regulated according to the passenger compartment cooling demand requirement A_FGR. At the same time the cooling demand requirement A_HVS of the electric accumulator is fulfilled by suitably driving the second solenoid valve HVS_V, by which the cooling capacity of the second compressor can be influenced or more specifically reduced. For this purpose the second solenoid valve HVS_V is correspondingly clocked as a function of the requirement A_HVS.

If, however, it is detected in the first step that the cooling demand requirement A_HVS of the electric accumulator is greater than the cooling demand requirement A_FGR of the passenger compartment, then the next step also prompts whether a cooling demand requirement for the passenger compartment is present at all—that is, whether A_FGR=0.

If there is no cooling demand for the passenger compartment, the compressor KMV for cooling the accumulator will be driven at a defined rotational speed DZ1. At the same time the first solenoid valve FGR_V, which is located in the cooling circuit for the passenger compartment and serves to adjust the cooling capacity of the first evaporator, is closed, so that no cooling of the passenger compartment takes place.

If, however, there is a cooling demand for the passenger compartment, but this cooling demand A_FGR is less than the cooling demand requirement A_HVS for the electric accumulator, then the compressor KMV for cooling the accumulator is also driven in a manner identical to the above at the defined rotational speed DZ1.

Of course, the first solenoid valve FGR_V, which is located in the cooling circuit for the passenger compartment and serves to adjust the cooling capacity of the first evaporator, is not closed. Rather the cooling demand requirement A_FGR of the passenger compartment is fulfilled by suitably driving the first solenoid valve FGR_V, by which the cooling capacity of the first compressor can be influenced, in that the first solenoid valve FGR_V is correspondingly clocked as a function of the requirement.

Research has already shown that it is possible to improve the maximum temperature level for an electric accumulator by 10 K to 15 K with such a design of the drive of the cooling unit and the corresponding design of the cooling unit. At the same time the temperature spread is reduced by up to 15 K.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a cooling device for vehicles, wherein said cooling device includes a refrigerant compressor, a condenser arranged downstream of the refrigerant compressor in a flow direction of the refrigerant, a first evaporator arranged downstream of the condenser for cooling the air to be supplied to a passenger compartment, a second evaporator arranged parallel to the first evaporator for cooling an electric accumulator, and a control unit configured to control the refrigerant compressor as a function of at least one of a cooling demand for the passenger compartment and a cooling demand for the electric accumulator on the basis of the higher cooling demand, comprising the acts of:
   determining which of a cooling demand of the electric accumulator and a cooling demand of the passenger compartment is greater;
   if the cooling demand of the electric accumulator is not greater than the cooling demand of the passenger compartment, controlling a closed loop control of the refrigerant compressor with the control unit based on the cooling demand of the passenger compartment;
   if the cooling demand of the electric accumulator is greater than the cooling demand of the passenger compartment, determining whether the cooling demand of the passenger compartment is zero;
   if the cooling demand of the passenger compartment is zero, controlling the refrigerant compressor with the control unit to a predefined refrigerant compressor rotational speed; and
   if the cooling demand of the passenger compartment is not zero, controlling a the refrigerant compressor with the control unit to the predefined rotational speed.

2. The method of claim 1, wherein
   the cooling device includes a first electric valve between the condenser and the first evaporator and a second electric valve between the condenser and the second evaporator, and
   the control unit is configured to control at least one of the first electric valve to control an evaporator capacity of the first evaporator and the second electric valve to control an evaporator capacity of the second evaporator,
   further comprising the acts of:
   controlling at least one of the first electric valve and the second electric valve with the control unit as a function of at least one of the cooling demand requirement for the passenger compartment and the cooling demand requirement for the electric accumulator.

3. The method of claim 2, wherein
   if the cooling demand of the passenger compartment is zero when the cooling demand of the electric accumulator is greater than the cooling demand of the passenger compartment such that the refrigerant compressor is controlled to the predefined rotational speed, operating the first electric valve in a closed position.

4. The method of claim 2, wherein
   in the event that the cooling demand for the electric accumulator is higher than a cooling demand for the passenger compartment and the cooling demand for the passenger compartment is not zero such that the refrigerant compressor is controlled to the predefined rotational speed, operating the first electric valve to meet the cooling demand for the passenger compartment.

5. The method of claim 2, wherein
   in the event that the cooling demand for the passenger compartment is higher than a cooling demand for the electric accumulator, such that the refrigerant compressor is controlled on the basis of the cooling demand requirement for the passenger compartment, operating the second electric valve to meet the cooling demand of the electric accumulator.

6. A cooling device for vehicles, comprising:
   a refrigerant compressor;
   a condenser downstream of the refrigerant compressor in a flow direction of the refrigerant;
   a first evaporator downstream of the condenser for cooling air to be supplied to a passenger compartment;
   a first electric valve between the condenser and the first evaporator;
   a second evaporator arranged parallel to the first evaporator and is intended for cooling an electric accumulator;
   a second electric valve between the condenser and the second evaporator; and
   a control unit configured to control a compressed refrigerant output of the refrigerant compressor to meet a higher one of a cooling demand for the passenger compartment and a cooling demand for the electric accumulator
   wherein the control unit is configured such that
      if the cooling demand of the electric accumulator is not greater than the cooling demand of the passenger compartment, the control unit controls a closed loop control of the refrigerant compressor based on the cooling demand of the passenger compartment,
      if the cooling demand of the electric accumulator is greater than the cooling demand of the passenger compartment and the cooling demand of the passenger compartment is zero, the control unit controls the refrigerant compressor to a predefined refrigerant compressor rotational speed; and
      if the cooling demand of the electric accumulator is greater than the cooling demand of the passenger compartment and the cooling demand of the passenger compartment is not zero, the control unit controls the refrigerant compressor to the predefined rotational speed.

7. The cooling device of claim 6, wherein
   the control unit is configured to control at least one of the first electric valve to control an evaporator capacity of the first evaporator and the second electric valve to control an evaporator capacity of the second evaporator, and
   the control unit is configured to control at least one of the first electric valve and the second electric valve as a function of at least one of the cooling demand requirement for the passenger compartment and the cooling demand requirement for the electric accumulator.

8. The cooling device of claim 6, wherein
   the control unit is configured such that when the cooling demand of the passenger compartment is zero when the cooling demand of the electric accumulator is greater than the cooling demand of the passenger compartment, the control unit controls the refrigerant compressor to the predefined rotational speed and controls the first electric valve to be closed.

9. The cooling device of claim 6, wherein the control unit is configured such that when the cooling demand for the electric accumulator is higher than a cooling demand for the passenger compartment and the cooling demand for the passenger compartment is not zero, the control unit controls the refrigerant compressor to the predefined rotational speed and controls the first electric valve to meet the cooling demand for the passenger compartment.

10. The cooling device of claim 6, wherein the control unit is configured such that when the cooling demand for the passenger compartment is higher than a cooling demand for the electric accumulator, the control unit controls the refrigerant compressor on the basis of the cooling demand requirement for the passenger compartment and controls the second electric valve to meet the cooling demand of the electric accumulator.

* * * * *